Oct. 9, 1962 H. REIFENHÄUSER 3,057,010
ELONGATED SLIT NOZZLE
Filed Aug. 22, 1960
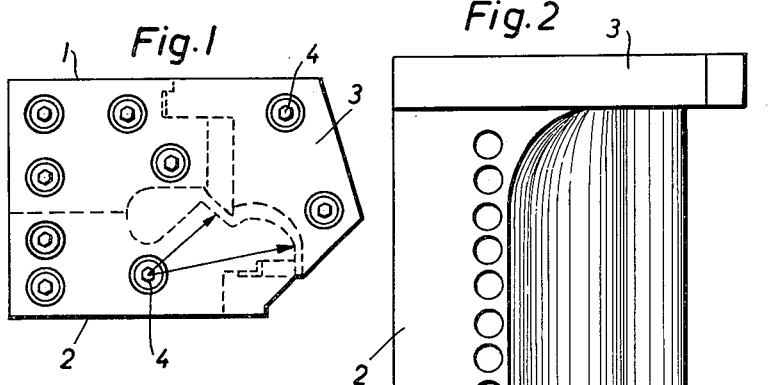
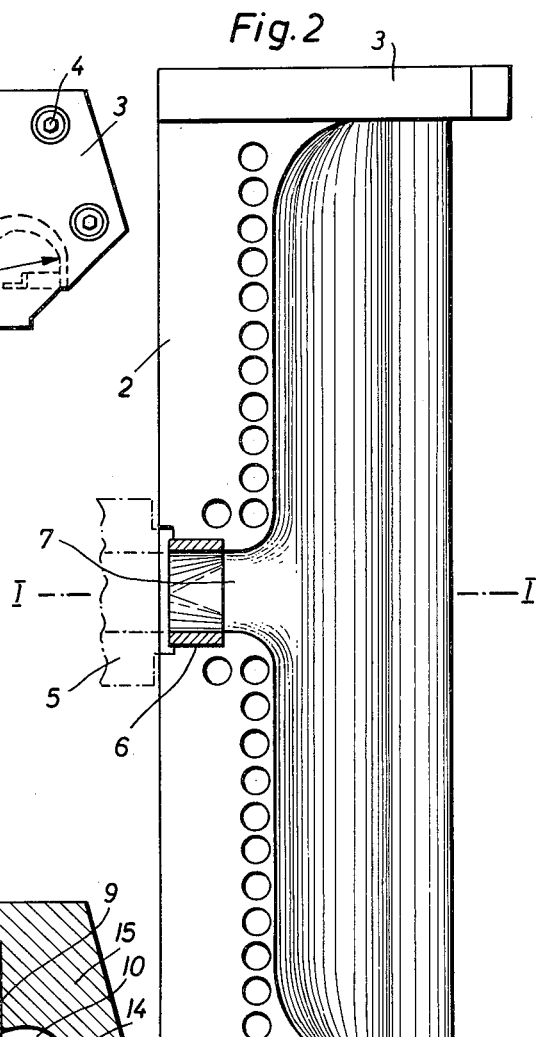
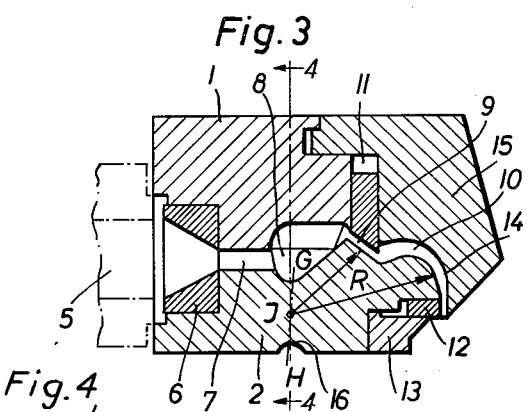
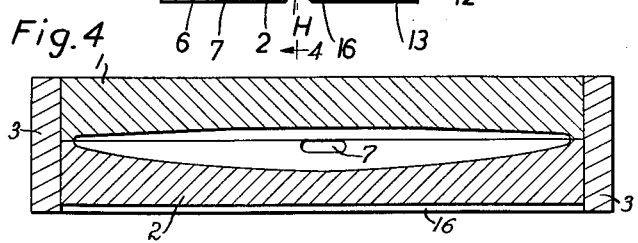
INVENTOR
HANS REIFENHÄUSER
BY Williams, Tilberry & Gotrick
ATTYS.

3,057,010
ELONGATED SLIT NOZZLE
Hans Reifenhäuser, Troisdorf, near Koln, Germany, assignor to Reifenhauser, K.G., Troisdorf, Koln District, Germany
Filed Aug. 22, 1960, Ser. No. 51,046
3 Claims. (Cl. 18—12)

The present invention relates to an elongated slit nozzle for the preparation of flat products, particularly such as foils or films and plates from thermoplastic synthetic materials.

The production of foils, films or plates through the continuous extrusion of thermoplastic materials from an elongated slit nozzle is well known to the prior art and technology. For such an operation the necessary extrusion pressure is produced through an extrusion press as for example a screw type extrusion machine. In such case the flow resistance of the nozzle must be so predetermined that even highly viscous masses introduced at one part of the nozzle structure are equally distributed over the entire extent of the nozzle opening through the flow-producing pressure. Plate nozzles of the usual construction, which are comprised of a longitudinal beam divided at the middle into parts designated as upper and lower parts under this pressure however are subjected to a high bending stress producing an undesirable variation of the nozzle opening width. Yet in contrast, in the production of high quality flat or sheet synthetic plastic products it is necessary that the product form-determining pair of lips on the outlet side of the nozzle, that is, the edges of the nozzle slit, maintain a constant spacing over the entire length of the nozzle outlet, since otherwise the thickness of the plate or foil produced uncontrollably changes. However, were it attempted to build a nozzle of the hitherto usual type of construction so rigidly that such sort of product malformations would generally no longer appear, then the expense of construction or fabrication would be unduly great, without ever attaining certainty that the established spacing of the pair of nozzle margins or lips would be held completely constant during extrusion operation.

The end and purpose of the present invention is so to absorb the forces arising in extrusion of foils or plates in an elongated slit type nozzle that such forces can no longer produce any alteration or variation in the width of the product form-producing nozzle mouth or outlet slit.

According to the present invention this object is attained by curving the product form-determing pair of lips or edges bounding the nozzle channel or passage beyond the outlet slit to a circular arcuate form, and by directing the mass flow in this region in such fashion that the nozzle lips shift parallel to each other, without producing a slit-widening under the pressure of the plastic mass; for the forces applied to the upper and lower nozzle parts are directed parallel to the outlet slit, therefore also parallel to the nozzle slit. Therefore in the event of a deformation under the pressure of the plastic mass, the nozzle lips, which are to have a circular segmental form of cross section, move in the direction of the issuing mass stream without changing the spacing of the same from each other, for the nozzle outlet discharge now extends always parallel to the forces operating in the nozzle channel.

According to the invention, the most suitable conditions are attained herein if through a corresponding curvature of the nozzle channel the direction of the mass flow to the circularly, arcuately formed lips is attained over an angle of about 90°, and advantageously through a circularly arcuate path. The nozzle body can be comprised of a plate form of upper and lower parts, and also of a machine shaped round material body, which is assembled into a segmental form of outlet cross section. Likewise the mass stream can also be guided or turned through a right angle or through to a desired curve, according to the operating conditions, which are suitable for the diverse thermoplastic masses which are to be worked.

By a further elaboration of the invention, in the case of a nozzle block comprised of an upper and lower part, it is proposed that one part, usually the under part, be elastically supported in a certain region in order that it may corresponding yield or deflect according to the pressure conditions. This yieldability is attained by weakening, over its entire longitudinal extent and parallel to the outlet lip pair, the under part of the nozzle structure which carries the lower nozzle lip, through a narrowing of its cross section; in which case the distance of this narrowing from the outlet of the elongated slit nozzle corresponds approximately to the radius of curvature of the under lip, and the middle point or center of curvature lies in the neutral zone of the weakened cross section. Practically, this center of curvature lies about in the middle of the lower beam and thereby in the neutral line of the bending zone. Consequently no variation in the plate outlet thickness can arise because of the operation in the nozzle interior of the mass subjected to high pressure.

In the drawings one example of construction, the new elongated slit nozzle is disclosed, wherein:

FIG. 1 is a side view of the nozzle;

FIG. 2 is a plan view of the lower beam of the nozzle, with the upper part removed;

FIG. 3 is a cross section through the nozzle taken as indicated by the line I—I of FIG. 2; and FIG. 4 is a cross section taken substantially as indicated by the line 4—4 in FIG. 3.

The elongated slit nozzle, comprised of the upper part 1, lower part 2, and the cheek plates 3 held together by screws 4, is connected to or sealed to a screw press 5 of known construction through the interposition of an oval insert piece 6. This piece 6 conducts the plastic extrusion mass to the extrusion channel 7 through which the mass by way of a distributing channel 8 and necked region 9 reaches the exit or outlet slit 10 of the elongated nozzle. The narrow cross section 9, in known manner, is here adjustable through a dam element 11. The outlet slit or slot 10 on one side is delimited by the lower lip including a bar 12 adjustably clamped by the under support bracket or ledge 13; and on the other side by the upper lip 14 which is machined in the head support 15 of the upper part 1. The under part 2 of the nozzle, at a determined spacing from the outlet slit 10, is narrowed in cross section—on one side by the distributing channel 8 and on the other side through an additional groove 16. The spacing of this narrowed cross section from the curved lip pair corresponds approximately to the radius of the curvature R so that the mid point of curvature of the two lips lies approximately on the connecting line G—H of the deepest portion of the two reliefs, at the middle point J; and hence the plane passed through this middle point parallel to the upper and lower parts likewise represents the neutral zone for the bending moments or stress. In other words the origin of the two radii of curvature to the nozzle lips must lie in the neutral point of the aforementioned weakened bending cross section, so that accordingly in fact no widening of the effective nozzle slit can arise through the pressure applied before the nozzle proper.

I claim:

1. In an elongated slit type nozzle for extruding a sheet of thermoplastic material and particularly adapted to extrusion of thin films, said nozzle including a channel for leading material to a longitudinal outlet slit determining the shape of the sheet, the outlet end of said channel being formed by a pair of spaced lips having longitudinally straight parallel terminal margins defining the outlet slit, that improvement comprising: a pair of elongated members each bearing a respective said lip and said lips having opposed channel outlet end defining surfaces curved toward the outlet slit in substantially circularly arcuate form, and one of said members having a longitudinal region of locally weakened cross-section, said region being spaced from the outlet slit a distance approximately equal to the radius of curvature of the lip on said one member with the center of curvature lying substantially on the bending neutral axis at said cross section; whereby under bending forces arising from extruding pressure of the plastic material said lips are relatively displaceable only by movement in a direction parallel to the direction of extrusion at the slit without change of the effective slit spacing.

2. The nozzle improvement as described in claim 1, wherein the outlet end portion of said channel defined by said curved surfaces is curved through a substantially circular arc of about 90° up to the outlet slit.

3. The nozzle improvement as described in claim 1 wherein the center of curvature for the other said lip substantially coincides with that of the one said lip.

References Cited in the file of this patent
UNITED STATES PATENTS

| | | |
|---|---|---|
| 2,090,404 | Parkhurst | Aug. 17, 1937 |
| 2,096,362 | Lehman | Oct. 19, 1937 |